United States Patent
Rondot et al.

(10) Patent No.: US 7,432,682 B2
(45) Date of Patent: Oct. 7, 2008

(54) STEPPER MOTOR STOP AND STALLING DETECTION METHOD, AND STOP-DETECTOR-EQUIPPED STEPPER MOTOR

(75) Inventors: Eric Rondot, Berthelange (FR); Daniel Prudham, Thise (FR)

(73) Assignee: Moving Magnet Technologies, Besancon (FR)

( * ) Notice: Subject to any disclaimer, the term of this patent is extended or adjusted under 35 U.S.C. 154(b) by 0 days.

(21) Appl. No.: 10/577,157

(22) PCT Filed: Nov. 3, 2004

(86) PCT No.: PCT/FR2004/050557

§ 371 (c)(1),
(2), (4) Date: Dec. 11, 2006

(87) PCT Pub. No.: WO2005/043743

PCT Pub. Date: May 12, 2005

(65) Prior Publication Data

US 2007/0132422 A1    Jun. 14, 2007

(30) Foreign Application Priority Data

Nov. 3, 2003    (FR) .................................. 03 50772

(51) Int. Cl.
*H02P 8/00* (2006.01)
(52) U.S. Cl. ...................... 318/696; 318/685; 318/468; 318/470
(58) Field of Classification Search ................. 318/696, 318/685, 468, 466, 470, 700; 187/293
See application file for complete search history.

(56) References Cited

U.S. PATENT DOCUMENTS

| 5,460,244 | A | * | 10/1995 | Tanahashi | .................... 187/293 |
| 5,666,066 | A |   | 9/1997  | Jo et al. | |
| 2002/0173935 | A1 | | 11/2002 | Miura | |

FOREIGN PATENT DOCUMENTS

| DE | 23 61 003 | 6/1975 |
| DE | 35 16 502 | 11/1986 |
| DE | 296 09 570 | 10/1996 |
| FR | 2 721 456 | 12/1995 |

* cited by examiner

*Primary Examiner*—Karen Masih
(74) *Attorney, Agent, or Firm*—Oblon, Spivak, McClelland, Maier & Neustadt, P.C.

(57) ABSTRACT

A stop-detection method intended for a multi-phase synchronous geared motor that is controlled in a stepping mode, which measures the sum of the currents circulating in each of the N phases of the geared motor. In the method the stop detection threshold is calculated in relation to the change in the sum of the currents.

13 Claims, 4 Drawing Sheets

Figure 5:
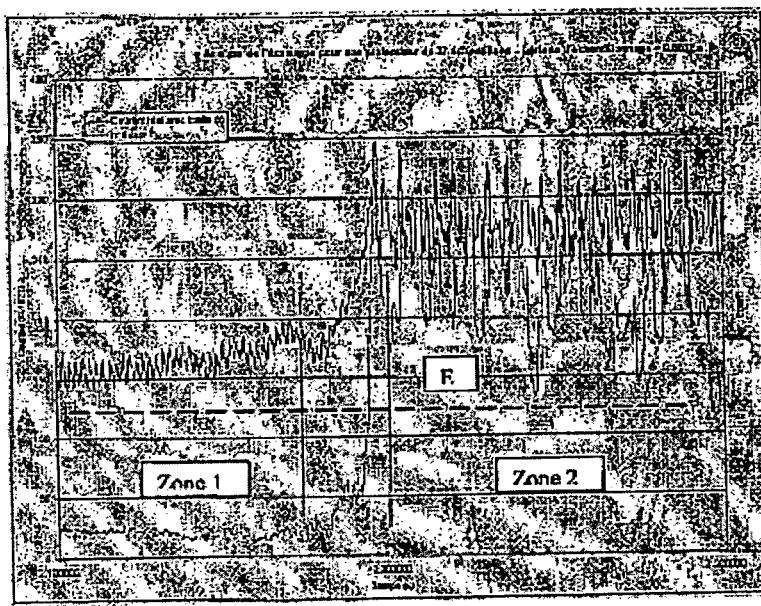

Fig. 5: [poorly legible]

Analysis of the standard deviation for a depth of 32 samples – sampling period = 0.0002 s Real current with end stop
Deviation No.

STEPPER MOTOR STOP AND STALLING DETECTION METHOD, AND STOP-DETECTOR-EQUIPPED STEPPER MOTOR

The present invention relates to the art of gear motors of stepper type (synchronous multi-phase motors operated in "stepped" mode), and more particularly to gear motors operated in "micro-stepped" mode.

Figure 1:
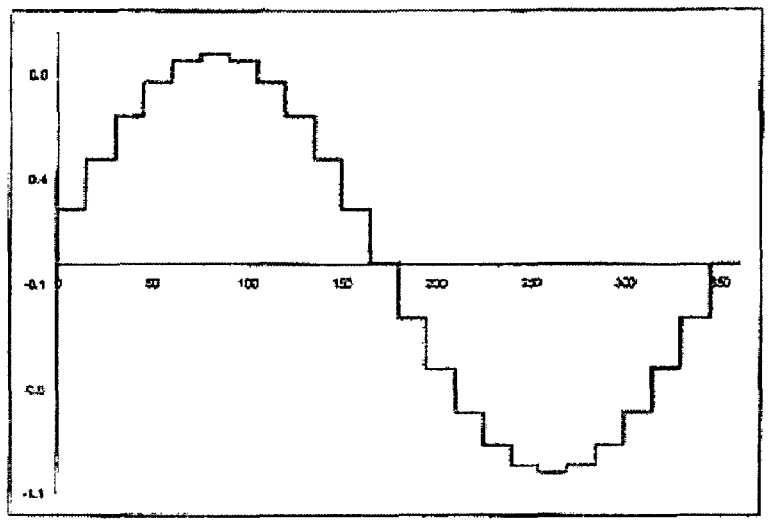

For better understanding the principle of the invention, it will be recalled that the "stepped" mode of operation leads to rotational increments undergone by the rotor, known as whole steps, which for a three-phase (or two-phase) motor, correspond, for example, to 6 (or 4) whole steps per electric period of the current present in each phase. To reduce this rotational increment in such a way, for example, as to reduce the operating noise and vibrations generated by the rotor, the whole steps can be subdivided into micro steps, as indicated in FIG. 1.

Figure 2:
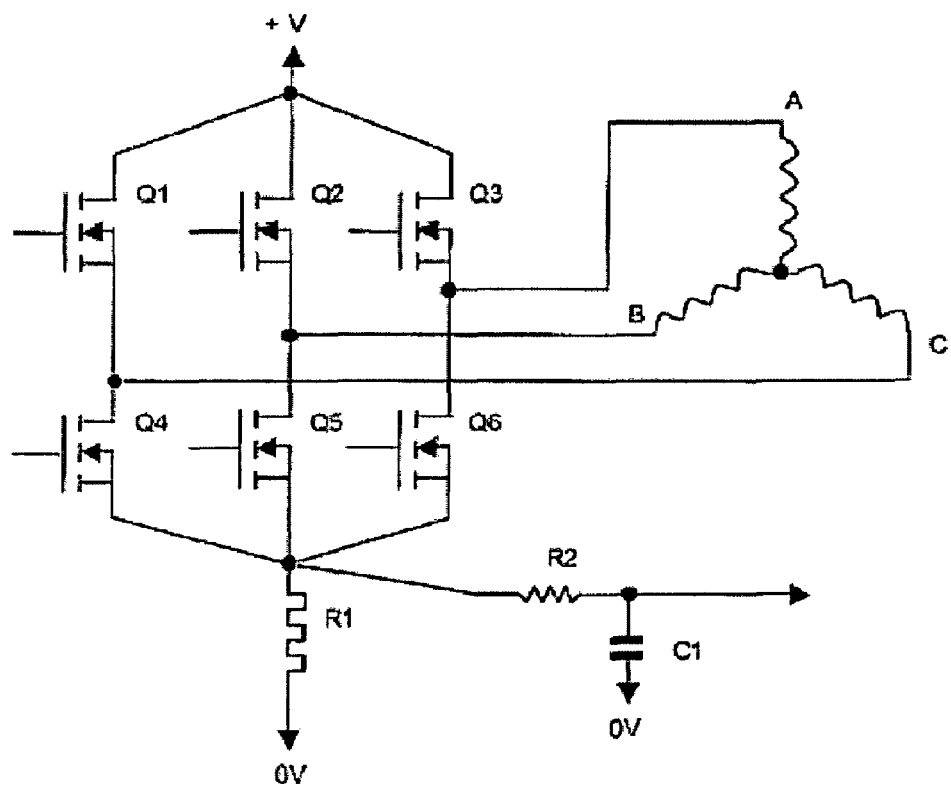

For this purpose, and in contrast to the whole-step driver mode, each of the phases of the motor must then be driven with a current of sinusoidal form that depends on the number of micro steps per step, and in the example of FIG. 2, it is apparent that, for a three-phase motor, six transistors will be necessary so that three substantially sinusoidal current waves with phase spacing of 120° electric can be imposed simultaneously in the three phases of the motor.

The usual methods for detection of end stops or stalling of stepper gear motors use means for detecting the value of the induced voltage in the phases of the motor during particular states of the control transistors of these phases (such as open state, in which the induced voltage in the unused phase can be measured without interference).

It is seen, therefore, that for multi-phase motors operated in "micro-stepped" mode using all power transistors simultaneously, it is difficult to gain access to this measurement of induced voltage.

Means for detecting blockage of stepper motors can be found in the prior art, for example in EP 0458159, U.S. Pat. No. 4,672,282, US 20003/0117100, EP 1178379 and US 20003/0155883, where there is measured the value of the induced voltage in one of the phases of the motor or its effect on the current circulating in the coils. The great disadvantage of all of these solutions is the high sensitivity to motor tolerances (the induced voltage is proportional to the torque constant of the motor, to the number of turns, to the temperature, etc.) and to resonance modes of the motor rotor, and the degree of reliability of detection is low, with a dependence on external events. Another disadvantage of these solutions, as mentioned in EP 1178379 or US 20003/0117100, for example, is that detection takes place in whole steps or in ½ steps, during very precise sequences of no supply to the phases. The disadvantage of these methods is therefore that the end-stop information is not instantaneously available, necessitates a measurement in each phase in order to be precise, and does not permit continuous supply to the phases of the motor.

The object of the invention is to propose a reliable and robust method for detection of end stops of multi-phase gear motors, and more particularly those operated in "micro-stepped" mode, without measurement of the induced voltage during a state of no supply to the phases, through measurement of the total current consumed by the N phases of the motor.

In its most general meaning, the invention relates to a generic method for detection of end stops that is applicable to "micro-stepped" supply of two-phase or three-phase motors in current mode (operation with constant current in the phases) or voltage mode (operation with constant voltage). The "micro-stepped" supply modes have the advantage that the rotor displacement increments are much finer than in the "whole step" modes, which leads to much less operating noise. This aspect is particularly important in the applications of gear motors for air-conditioning valves, but heretofore no method for detecting end-stops in "micro-stepped" mode of operation had been proposed.

The principle of the invention consists in measuring, in the sampling resistor R1 (FIGS. 2 and 3), the total current consumed in the sum of the N phases of the multi-phase motor, and considering the gear motor as a system whose function is to transform an input electric power $P_{Elec}$ (equal to the product of the supply voltage +V (FIG. 2 and FIG. 3) times the total current I circulating in R1) to a mechanical power $P_{Mechanical}$ (equal to the product of the torque delivered by the gear motor times its speed) and to a Joule power $P_{Joule}$ (equal to the sum of the Joule powers dissipated in the N phases of the motor):

$$P_{Elec} = U \cdot I = P_{Joule} + P_{Mechanical}$$

meaning that $I = f(P_{Joule} + P_{Mechanical})$

This formula is approximate, since it does not take into account losses in the reducing gear, but, we see clearly that, as a function of the values assumed by $P_{Joule}$ and $P_{Mechanical}$, it is possible to interpret particular operating conditions during measurement of the total current I of the phases.

Figure 4:
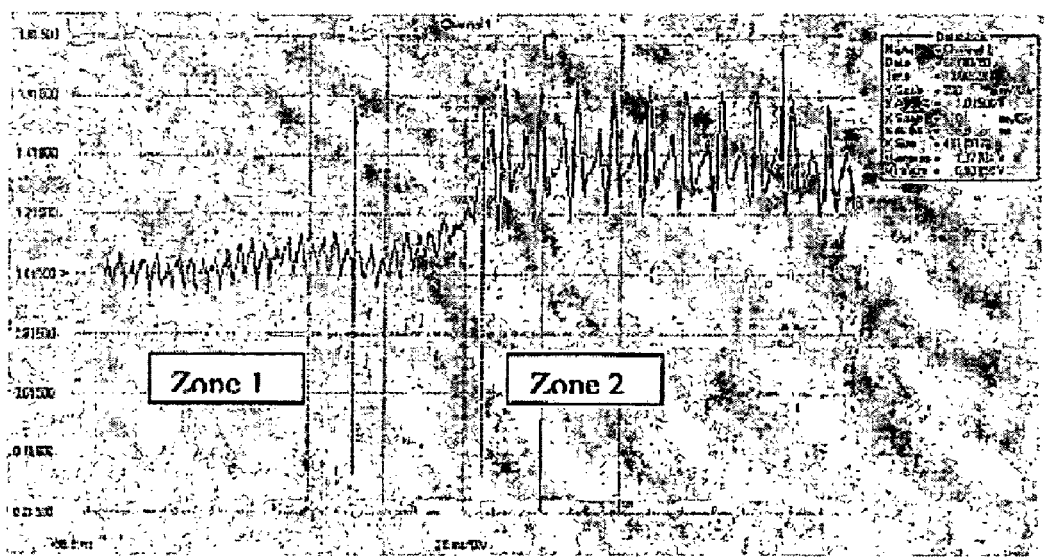

As an example, FIG. 4 shows the evolution of the total current I circulating in resistor R1 between operation in micro-stepped mode at constant speed and stalling of the rotor.

Advantageously, it is possible to associate, with the method of measuring the total current in the N phases, a mathematical or statistical method for processing the variation of I, allowing us to discriminate clearly among a large load on the gear motor, an end stop or a stall.

According to one alternative version, the mathematical or statistical detection method consists in calculating a variable proportional to the square of the standard deviation of the values of the total current sampled in R1, in such a way as to impart sensitivity to the method and to obviate any consideration of the absolute value of the current I.

Advantageously, the method of the invention will include a step of determining the maximum torque applicable by the gear motor and/or a step of determining the synchronization loss of the rotor of the gear motor.

Figure 3:
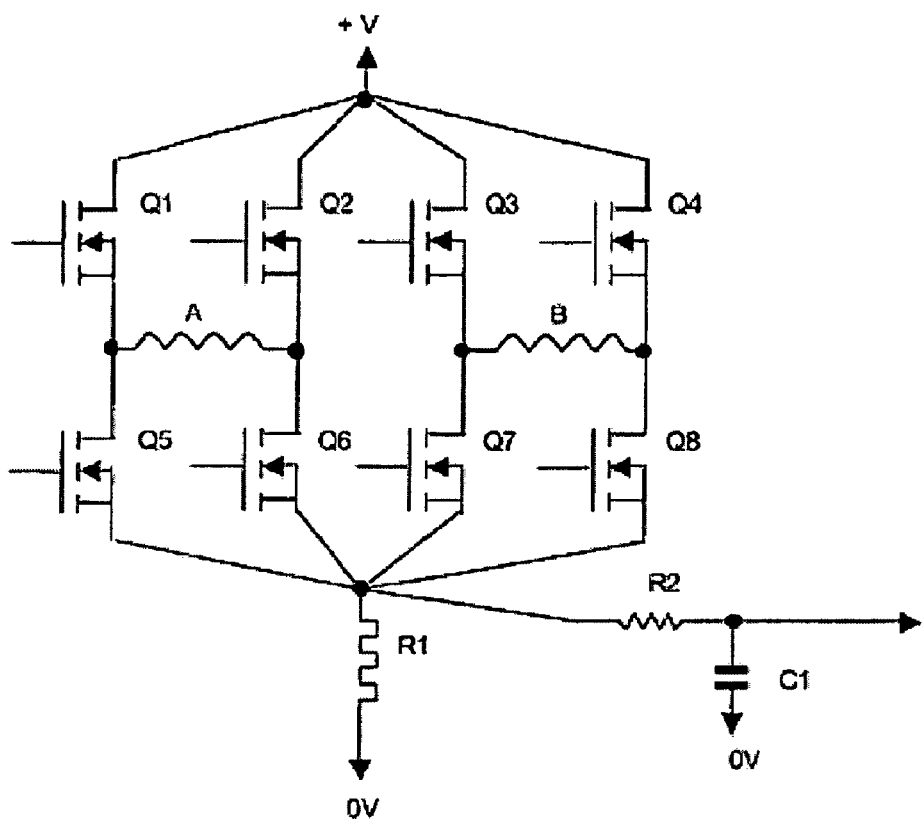
Figure 6:
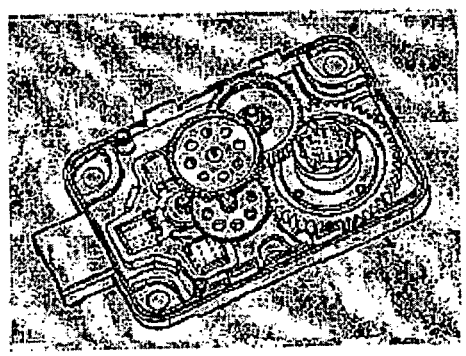
Figure 7:
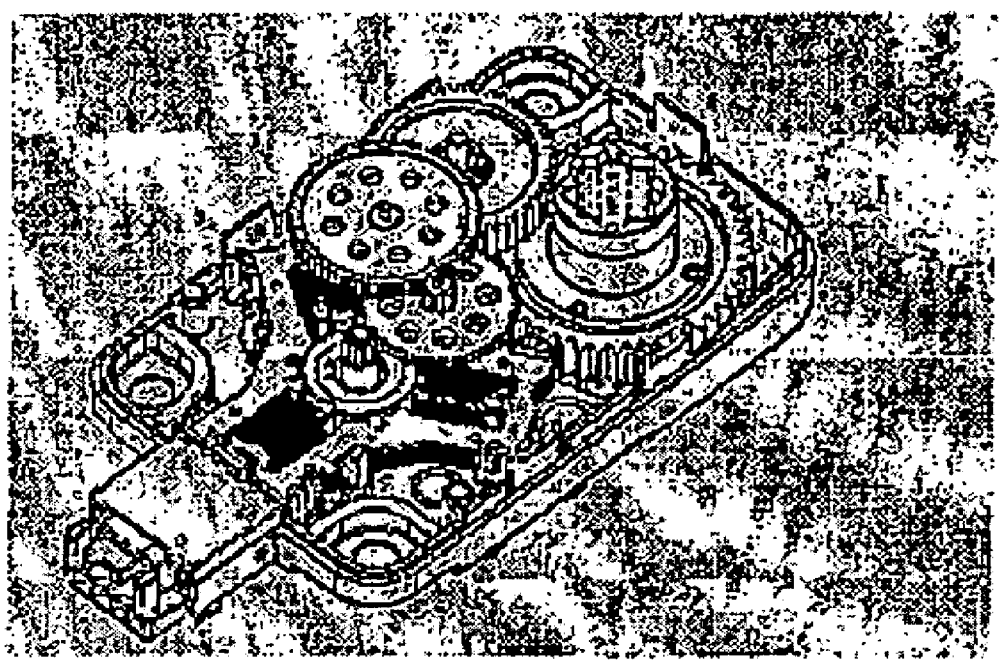

The invention will be better understood by reading the description hereinafter with reference to the attached drawings, wherein:

FIG. 1 represents one electric period of the current of one of the phases of a multi-phase motor, subdivided into "micro steps", FIG. 2 represents the simplified electric schematic of a three-phase driver according to the invention, FIG. 3 represents the simplified electric schematic of a two-phase driver according to the invention, FIG. 4 represents the total current consumed in a three-phase gear motor driven in "micro steps" in voltage mode, FIG. 5 represents the same total current and the value of its standard deviation squared, FIG. 6 shows the embodiment of a two-phase gear motor for application in an air-conditioning valve, FIG. 7 shows the embodiment of a three-phase gear motor for application in an air-conditioning valve.

FIG. 1 represents one electric period of the current of one of the phases of a multi-phase motor, subdivided in the present example into 24 "micro steps" per period, which is a number typically used to implement the invention, and which leads to a very large reduction of noise compared with the traditional use of six whole steps per electric period.

FIG. 2 shows the simplified electric schematic of a three-phase driver in "micro-stepped" mode according to the invention, using six transistors Q1 to Q6, Q1 and Q4 (or Q2 and Q5 or Q3 and Q6 respectively) driving the current passing through phase C (or B and A respectively). Resistor R1 is a sampling resistor used for measurement, by means of the filter (R2, C1), of the sum of the currents IA, IB, IC passing through each phase. The output of filter R2C1 will be processed by means of the analog-to-digital converter of a microcontroller, for example.

FIG. 3 shows the simplified electric schematic of a two-phase driver according to the invention, using eight transistors Q1 to Q8, wherein the sum of the currents of the two phases A and B is measured in resistor R1, by means of the filter (R2, C1).

FIG. 4 represents a view of the evolution of the sum of the current I of the N phases of a multi-phase motor, measured in R1, in micro-stepped supply mode. The current has a stable value in zone 1 of the graph, where the operation of the rotor of the gear motor is synchronous, regular and not affected by end stops or stalling, before evolving, in zone 2 of the graph, to a substantially higher and more irregular value, when the gear motor has reached an end stop.

FIG. 5 shows the implementation of a mathematical or statistical method for processing the variation of the current I measured in R1. In the example of FIG. 5, the value of the current I is sampled by means of an analog-to-digital converter of a microcontroller, for example, and the standard deviation $\sigma$ of the values $x_i$ of the N samples is calculated:

$$\sigma = \sqrt{\frac{N \cdot \sum_{i=0}^{N} x_i^2 - \left(\sum_{i=0}^{N} x_i\right)^2}{N^2}}$$

More precisely, the value $N^2 * \sigma$ is represented in FIG. 5, in comparison with the value of the total current I of the phases. It is quite evident that such a mathematical method makes it possible even more clearly to discriminate the zones 1 of regular operation from the zones 2 of operation at the end stop, and to fix a threshold standard deviation E for the values $N^2 * \sigma$ on the basis of which the microcontroller or the ASIC decides that the gear motor is at an end stop or stalled. Compared with methods disclosed in the prior art for analysis of the induced voltages of gear motors, it is seen that one of the great advantages of the method is its instantaneous reaction as soon as the detection threshold is passed.

FIGS. 6 and 7 represent three-dimensional views of two-phase or three-phase gear motors for an automobile air-conditioning valve, for which motors the invention is more particularly intended. As an example, the gear motors have reduction ratios on the order of 1/720, with four reduction stages, which leads to a certain elasticity of the reducing gear. This limited stiffness of the reducing gear explains the need for sensitivity of the detection method, so that a hard point to be passed by the gear motor is not confused with an end stop. The method of mathematical processing of the samples of the current I makes it possible to discriminate different states of the gear motor, such as:

regular synchronous mode, increase of the torque delivered by the gear motor, arrival at an end stop, with loss of synchronization of the rotor of the gear motor.

The method disclosed here for detection of an end stop or stalling of a stepper motor is preferentially applied to supply in micro-stepped mode, but it goes without saying that the number of micro steps per step for which the method remains valid can range from a value higher than 100 micro steps per step to a unit value corresponding to the whole step.

Similarly, the mode of operation, voltage or current, is not fundamental for implementation of the invention.

Similarly, the mathematical operations of processing of the samples of total current of the phases can be varied, and can be based on means, standard deviations or any other statistical method of processing the signal.

In addition, the detection method according to the invention is more particularly applied to stepper gear motors having a reduction ratio that can range from a value higher than 1/1000 to a unit value corresponding to use of the motor in direct engagement with its load.

The invention claimed is:

1. A method for detecting an end stop of a synchronous multi-phase gear motor operated in a stepped mode, the method comprising:

measuring a sum of currents circulating in each of N phases of a gear motor; and calculating an end-stop detection threshold relative to evolution of the sum of the currents measured in said step of measuring.

2. A detection method according to claim 1, wherein said measuring of the sum of the currents circulating in each of the N phases of the gear motor is performed by sampling.

3. A detection method according to claim 1, further comprising the step of:

processing the sampled current values by a mathematical or statistical operation; and determining the end-stop detection threshold relative to the result of the processing.

4. A detection method according to claim 1, further comprising the step of:

detecting an end stop for discrimination between a zone of synchronous operation of the gear motor in micro-stepped mode and a zone of arrival at an end stop.

5. A detection method according to claim 1, applied to two-phase stepper gear motors.

6. A detection method according to claim 1, applied to three-phase stepper gear motors.

7. A detection method according to claim 1, applied to gear motors of automobile air-conditioning valves.

8. A detection method according to claim 1, further comprising the step of:

determining maximum torque applicable by the gear motor.

9. A detection method according to claim 1, further comprising the step of:
   determining loss of synchronization of a rotor of the gear motor.

10. A detection method according to claim 1, applied to stepper gear motors having a reduction ratio of 1 to r, where r is a finite real number.

11. A detection method according to claim 1, applied to stepper gear motors driven in micro-step mode with m micro-steps per step, where m is an integral number greater than or equal to 1.

12. A multi-phase gear motor provided with a stepper motor and an electronic circuit for operation in a micro-stepped mode, comprising:

an end stop detector of a circuit that is configured to measure a total current consumed by N phases of a motor, and configured to detect the end stop based on the total current measurement.

13. A multi-phase gear motor according to claim 12, wherein the end-stop detector further comprises;

a sampling resistor; and a sensing unit configured to measure in the sampling resistor, the total current consumed in a sum of the N phases of the motor.

* * * * *